United States Patent

Riesmeier

[11] Patent Number: 5,144,737
[45] Date of Patent: Sep. 8, 1992

[54] APPARATUS FOR APPLYING AND CONTOURING EDGE STRIPS FOR PLATES

[75] Inventor: Wilhelm Riesmeier, Lübbecke, Fed. Rep. of Germany

[73] Assignee: IMA-NORTE Maschinenfabriken Klessmann GmbH & Co., Gutersloh, Fed. Rep. of Germany

[21] Appl. No.: 764,008

[22] Filed: Sep. 23, 1991

[30] Foreign Application Priority Data

Sep. 24, 1990 [DE] Fed. Rep. of Germany ....... 4030138

[51] Int. Cl.⁵ .......................... B23Q 7/14; B23C 3/12
[52] U.S. Cl. .................................. 29/564.7; 144/142; 409/138
[58] Field of Search ................ 29/564.7, 564, 564.1, 29/33 P, 33 K, 33 Q; 144/142, 134 R, 144 A, 137; 409/138, 145, 162, 183, 189, 190, 197

[56] References Cited

U.S. PATENT DOCUMENTS

| | | | |
|---|---|---|---|
| 3,789,731 | 2/1974 | Loy | 29/33 Q X |
| 3,977,298 | 8/1976 | Linsinger | 409/138 |
| 4,260,001 | 4/1981 | Demuynck | 144/144 R X |
| 4,561,478 | 12/1985 | Fields | 144/134 R |

Primary Examiner—William Briggs
Attorney, Agent, or Firm—Charles E. Baxley

[57] ABSTRACT

A compact machine for applying and contour milling or cutting of edge strips or laminates at the narrow sides of plate-shaped workpieces, in a forward cycle and a reverse cycle, with a single operator location and in continuously travelling manner, with a single conveying device at which the plates are transversely arranged such that the respective leading narrow side is arranged perpendicularly with respect to a longitudinal, main axis of travel, and the respective plate overhangingly extends from the conveying device for access, as well as being secured by clamps. The apparatus also includes an edge-gluing device and a shaping-milling device, both of which, with respect to the longitudinal axis, are sequentially arranged laterally at the conveying device. The apparatus further includes at least one milling or cutting tool or unit, which extends with its axis of rotation transversely with respect to the main axis, as well as parallel with respect to the plane of the workpiece and which is at least capable of operatively contacting and contouringly engaging the upper side of the workpiece. At the conclusion of travel of the workpiece at the shaping-milling device, the milling unit is lowered, the direction of travel of the conveying device is reversed and during the return thereof, the milling unit is operatively engagingly moved along the lower side of the workpiece.

15 Claims, 3 Drawing Sheets

APPARATUS FOR APPLYING AND CONTOURING EDGE STRIPS FOR PLATES

FIELD OF THE INVENTION

This present invention relates to a machine for applying and contour milling or cutting of edge strips. More particularly, this invention is concerned with a machine for applying and then profiling an edge strip or laminate at the narrow sides of plate-shaped workpieces, in a continuously moving or travelling manner.

BACKGROUND OF THE INVENTION

The machine has a conveying device on which the plates are transversely arranged such that the respective leading narrow side is arranged perpendicularly with respect to the longitudinal or main axis (X) of travel, and the respective plate overhangingly extends beyond or laterally from the conveying device for access. The apparatus also includes an edge-gluding device and a shaping-milling device, both of which, with respect to the longitudinal axis (X), are sequentially or serially one behind the other and laterally arranged at the conveying device. The apparatus, furthermore, includes at least one milling or cutting tool or unit, which extends with its axis of rotation transversely with respect to the main axis (X) as well as parallel with respect to the plane of the workpiece and which is at least capable of operatively contacting, and to engage while following the contour of the upper side of a respective workpiece.

In known machines of this type, the profile or contour milling or cutting of the edge strips to be secured at the narrow sides or edges of a workpiece is carried out at two serially arranged work stations. Thus, when considered in the main direction of flow of material, next following behind the contour or profile milling unit, which includes a milling or cutting tool which is adapted to engage or is guided sufficiently closely along the upper surface or side of the workpiece, is arranged a second milling or cutting tool, which is adapted to engage or is guided sufficiently closely along the lower or bottom side or surface of the workpiece.

While this prior art arrangement allows a rather high feed velocity of the workpieces through the machine, a rather lengthy machine structure is necessary, as well as a corresponding workpiece input and workpiece exit or output at the different ends of the machine, since the workpieces are moved in one direction of travel only. At the input end or side, as well as at the exit end or side of the machine, either additional operator positions or automatically functioning devices need to be employed, thus leading to considerable operating and space requirements.

It is desirable, in the case of many applications of machines of the mentioned type, for reasons of organization and space, to feed and remove the workpieces at only one location. In this context, it is known from German Utility Patent No. 86 20 374, to arrange parallel with respect to the conveying device a returning device for the workpieces. The workpieces need then to be transferred, at the completion of the forward movement or path, from the conveying device to the returning device, which means that special transfer devices need to be used. The returning device is a further machine unit or component and requires considerable space when workpieces need to be moved back in horizontal attitude.

It is therefore an important main object of the invention to provide a machine of the type described which can be fed at one location, which is of compact structure and which does not require for the reversing or return cycle of the workpiece additional structural width, or separate return conveying devices.

SUMMARY OF THE INVENTION

The aforesaid object is achieved by the machine in accordance with the invention whereby at the conclusion of forward travel or cycle of the workpiece at the shaping-milling or contouring or profiling device, the milling unit is lowered, the direction of the conveying device is reversed and during the return travel the respective milling unit operatively engages and moves along the lower side or surface of the workpiece.

The particular advantage of the machine in accordance with the present invention resides in that only one conveying device is used for the forward movement or cycle and for the return movement or cycle of a workpiece, thereby eliminating the need for a separate conveying device for the return cycle of the workpieces.

Furthermore, with the milling tool the finish-machining of the edges is carried out on both the front edge on the upper side and the front edge on the lower side, as well as on the edges extending around the narrow sides, for which purpose the milling tool changes its position after reversal of the direction of transport of the workpiece. In a preferred embodiment, the finish-machining of the edges is carried out by means of a universal milling unit which performs the flush cutting-off at the leading and trailing edges of the workpiece, referred to the direction of passage, the rough and finish milling on the upper and lower edges and also the copy milling for shaped regions of the workpieces such as edge roundings. The machine of the invention is very compact and can be set to an optimum cutting speed for each region to be milled along the edges to be machined because at each moment only a single workpiece is being machined on the transport device.

In accordance with another feature of the invention, the shaping-milling device has a support at which are arranged the milling units, and which support is adapted so as to be at least movable perpendicularly with respect to the plane of the workpiece. During traversal of rounded edges or portions of the other narrow sides, which when viewed in the main direction of travel (X) are leading or following, the feed rate of the workpiece through the conveying device and the advancement of the milling unit or units are superposed by means of the support.

In accordance with another feature of the invention, the support of the milling device, when considered in the main direction of travel (X), can be moved along a limited distance of length in forward and reverse directions.

Thus, during shaping of rounded other narrow sides, which when considered in the direction of main direction of travel (X) are arranged forwardly and rearwardly, the support is moved along with the workpiece in the direction of travel (X). Also, during shaping of rounded other narrow sides, which when considered in the direction of main direction of travel (X) are arranged forwardly and rearwardly, the support with the milling tool can move along the edge contour, whereby the support is brought forward or is correspondingly positioned in its two axes of travel or motion, whereby the conveying device, when the workpiece is in approaching movement with respect to the shaping-milling device and/or leaving the shaping-milling device, is brought to the fully stopped condition.

In each case, one can optimize the cutting rate along the path of cutting for each section or range and, most of all, it can be reduced in the sections or operational ranges of the rounded profile portions which need to be followed or traversed.

Another feature of the invention is that at the support of the shaping-milling device two cutting tools are arranged. The two cutting tools are arranged serially when considered in the main direction of travel (X), and the first, on advancement of the workpiece at the leading side of the shaping-milling device for preliminary cutting or shaping, is arranged further away by an offset distance from the plane of the workpiece with respect to the second milling tool arranged at the exit side.

During a forward cycle or on advancement of the work-piece, the second milling tool, which when considered in the direction of main travel or axis (X) is the following milling tool, is in contacting manner tracing the upper side of the workpiece.

In the reverse cycle, i.e. on reversal of the direction of travel of the workpiece, at which the second milling tool becomes, as it were, the forward cutting or milling tool, it is used for preliminary shaping and is in contacting manner approached, since it has in the lower direction a separation distance in accordance with the offset dimension and the trailing first milling tool operatively engages the lower side or surface of a workpiece, which means that both milling tools are lowered additionally by the distance equivalent to the height or the offset dimension and at the reverse cycle or mode of the conveying device, i.e. change from forward to returning mode or cycle.

In accordance with one aspect of the invention, there is provided a machine for applying and contour milling or cutting of edge strips or laminates at the narrow sides of plate-shaped workpieces, in a continuously travelling manner, with a conveying device on which the plates are transversely arranged such that the leading narrow side is arranged perpendicularly with respect to the longitudinal or main axis (X) of travel, and the plate overhangingly extends from the conveying device for access, as well as being secured by clamps. The apparatus also includes an edge-gluing device and a shaping-milling device both of which, with respect to the longitudinal axis (X), are sequentially arranged laterally at the conveying device, and with the apparatus further including at least one milling or cutting tool or unit, which extends with its axis of rotation transversely with respect to the main axis (X), as well as parallel with respect to the plane of the workpiece and which is at least capable of operatively contacting and engaging the upper side of the workpiece and which is at least capable of operatingly contacting and engaging the upper side of the workpiece, characterized in that at the conclusion of travel of the workpiece at the shaping-milling device, the milling unit is lowered, the direction of travel of the conveying device is reversed and during the return thereof, the milling unit is operatively moved along the lower side of the workpiece in engagement therewith.

In accordance with another aspect of the invention there is provided a machine for applying and contouring edge strips to plate-shaped workpieces having narrow sides, comprising a conveying device, adapted to carry out a forward cycle and a return cycle for passing a workpiece to an edge-gluing device during a forward cycle, and for moving the workpiece in a forward cycle to a shaping-milling unit, to remove excess of edge strip from the workpiece, on which the workpiece is transversely arranged such that at least its leading narrow side is arranged perpendicularly with respect to the longitudinal main axis (X) of travel, and the plate overhangingly extends from the conveying device for access, and an edge-gluing device for applying an edge strip to a narrow side of the workpiece. Means for supplying a sufficient quantity of edge strip to the workpiece are disposed on the said conveying device. A shaping-milling device includes at least one rotary milling unit extending with its axis of rotation transversely with respect to the main axis of travel (X) and parallel with respect to the plane of the workpiece, and which is at least capable of operatively contacting and working the upper and lower sides and the corresponding edges of the workpiece.

In accordance with another aspect of the invention a machine for applying and contour-milling of plate-shaped workpieces has a first pair of narrow sides and a second pair of narrow sides, in a continuously travelling manner in a single-station mode, the machine including a conveying device on which the workpiece is transversely arranged such that at least the respective leading narrow side is arranged perpendicularly with respect to the main axis (X) of travel, and the plate overhangingly extends from the conveying device for access. An edge-gluing device is provided for applying an edge strip to a narrow side of a workpiece, and means are provided for supplying a sufficient quantity of edge strip to the workpiece. A shaping-milling device with at least one milling unit, extends with its axis of rotation transversely with respect to the main axis (X), as well as parallel with respect to the plane of the workpiece and is capable of operatively contacting and contouringly engaging the upper side of the workpiece. In method terms, the improvement comprises the steps, at a single work station, of positioning a workpiece at the conveying device, moving the workpiece with the conveying device, for securing a predetermined length of edge strip at a narrow side, to an edge-gluing device, moving the workpiece with the conveying device with reference to the shaping-milling device for profiling the workpiece at the narrow side with at least one milling unit, and moving the workpiece with the conveying device with reference to the shaping-milling device for profiling the workpiece at its narrow side with the one milling unit in a reverse cycle by lowering, at the conclusion of forward travel of the workpiece at the shaping-milling device, the respective milling unit, for operatively engagingly moving the lower side of the workpiece in reference to the milling unit.

The invention, both as to its machine and method aspects together with additional objects and advantages thereof, will be best understood from the following description of a specific embodiment when read in connection with the accompanying drawings.

DESCRIPTION OF THE INVENTION

Figure 1:
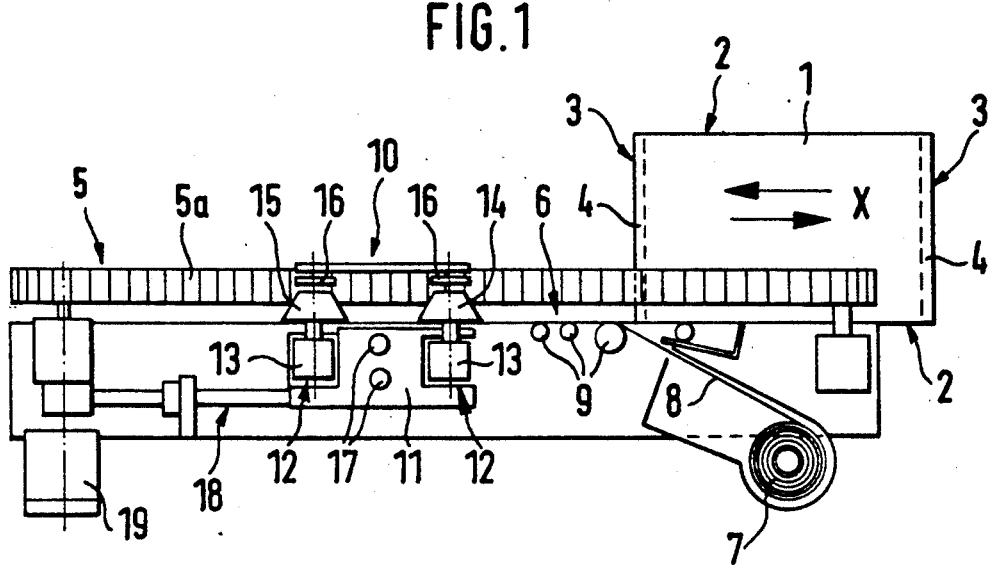
FIG. 1 is a schematic top plan view of the machine for applying and cutting or profile-trimming laminate edgestrip.

As shown in particular detail in FIGS. 1 and 2, a workpiece or plate structure, hereinafter workpiece or plate having a substantially rectangular configuration when viewed in top plan view, has a first pair of narrow or small sides 2, both of which are to be covered with an edge strip or laminate 8. At its other pair of narrow sides 3, the plate 1 has rounded or arcuate edges 4 in the regions or outline of which, as well as in conformity with the upper side 20 and the opposite lower side 21 of the plate 1, the overchanging or excess portions, respectively, A, B, C and D of the edge strip 8 need to be removed by milling, profiling or shaping.

Figure 2:
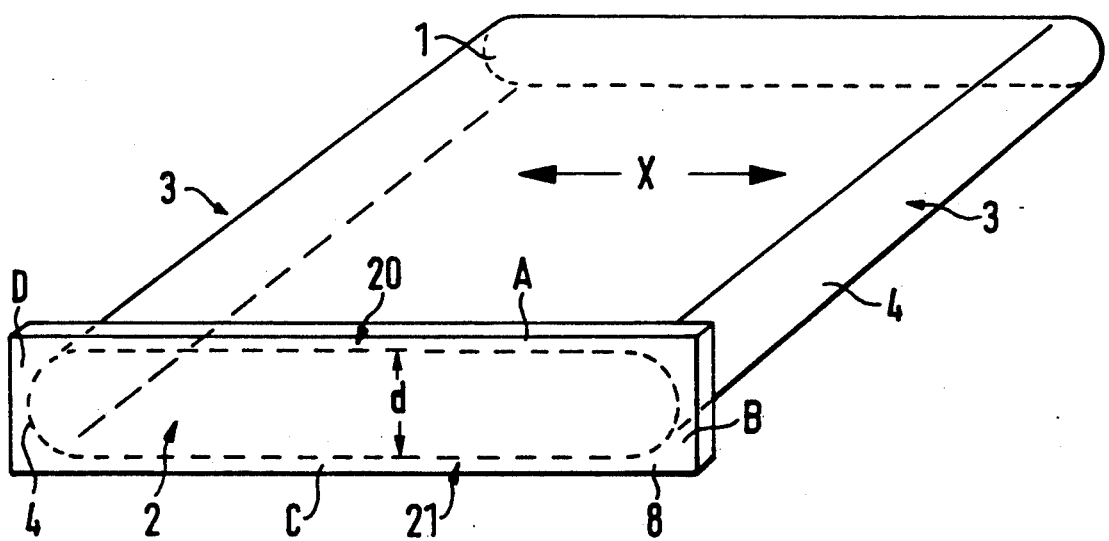
FIG. 2 is a perspective view at the forward portion of a plate which is to be shaped by the machine of FIG. 1, after application of the edge strip and prior to shaping to remove excess strip portions.
Figure 3:
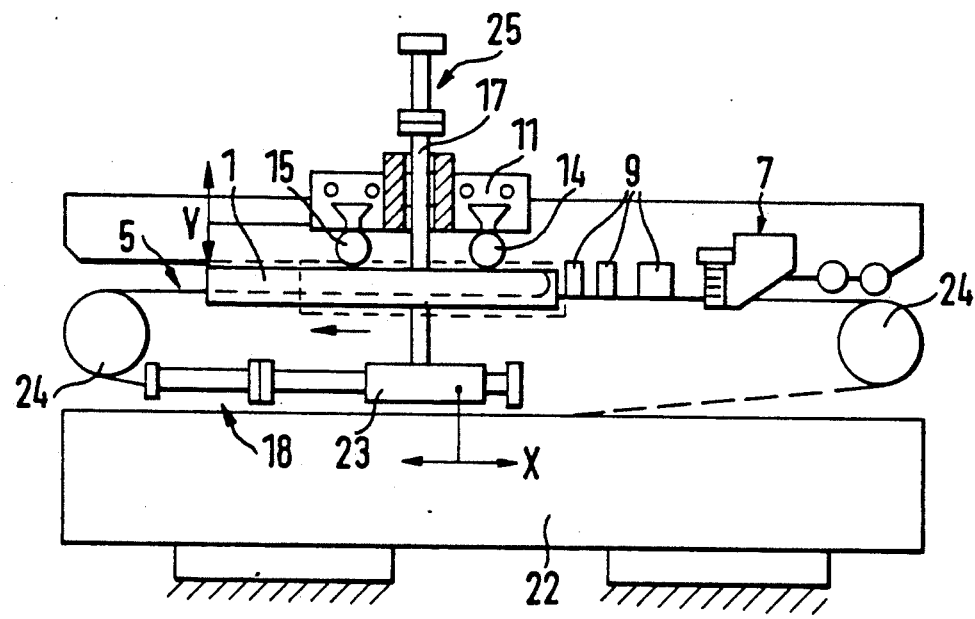
FIG. 3 is a first side elevation of the machine of FIG. 1, with an advancing workpiece.
Figure 4:
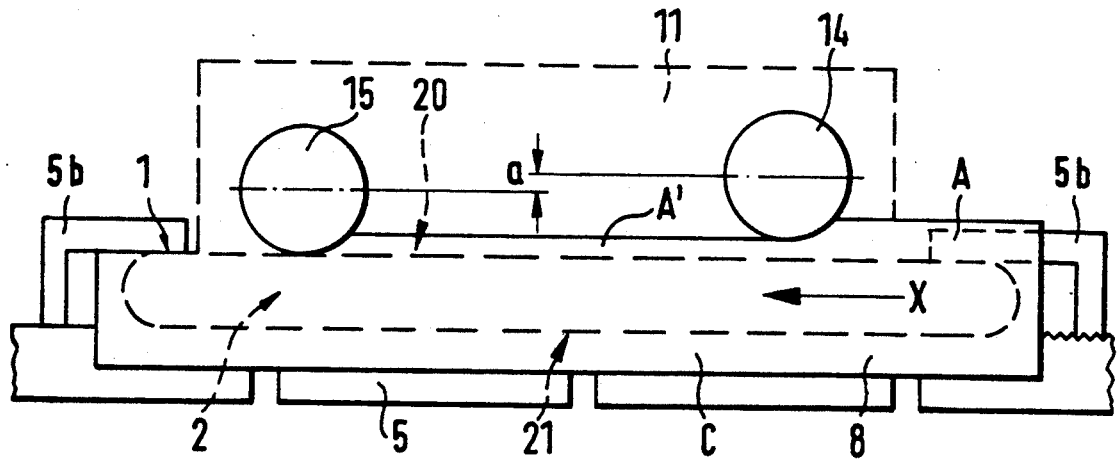
FIG. 4 is a front view, drawn to a larger scale, of the milling tools, as well as part of the conveying device of the machine of FIG. 1, as the workpiece advances.

With reference to FIGS. 1 and 3, the machine has a conveying device 5 with an endless chain 5a which is passed over sprocket wheels 24, one of which is driven by a motor or drive 19, whereby either by means of reversal of the drive direction of the motor 19 or with an intermediary transmission, not shown, the machine can be operated to advance in the direction along axis X, to carry out a forward cycle of operation, and can carry out a corresponding reverse travel or cycle movement. Furthermore, the conveying velocity or feed rate of the conveying device 5 can be variable. The conveying device 5 has clamping members 5b which are schematically indicated in FIG. 4, by means of which plate 1 is fixedly secured at the chain 5a of the conveying device 5.

For support of large plates, a second chain, not shown as being substantially identical with the first chain assembly 5 and 5a, can be arranged in parallel with respect to the first transporting chain 5a.

The conveying and reverse movement directions are indicated by the arrows X, whereby in one direction, a forward movement or cycle is afforded, and whereby in the opposite direction a reverse movement or cycle is afforded Plates 1 are secured at the conveying device 5 such that they are horizontally resting on the chain 5a and clamped or secured to be fixed in position, i.e. by the clamping members 5b as mentioned above, and such that they have overhanging or free ends projecting laterally from the conveying device 5 for access by an edge-gluing device 6 and a shaping-milling device shaping-milling unit 10.

As can best be seen on the right-hand side in FIG. 1, the plate 1 is positioned at the entrance side or end, this also serving as exit or removal side or end of the machine. Thus, plate 1 is transported from there on its forward travel or cycle to a predetermined position and the direction of travel of the conveying device 5 is then reversed, such that the plate 1 is brought back to its starting position in reverse direction along axis X, upon completion of the shaping or working operation.

Thus, the machine is supplied or fed with plates at one location and removal of finished plates 1 is achieved at the same location.

Commencing at the starting position, the conveying device 5 moves a plate 1 along the edge-gluing device 6 and the shaping-milling device 10 which provides two milling tools 14 and 15, which are arranged serially along the conveying device 5 in such manner that the free or overhanging ends or sides of the narrow or small sides 2 of plate 1 can be shaped or worked.

Initially, however, on forward travel of the plate 1 an edge strip 8 is brought from a supply 7 to the respective small side 2. This strip 8 is preglued to present a tacky surface and is solidly pressed, by way of pressure rollers 9, at which the workpiece 1 passes along, against the small side, surface or edge 2, of the workpiece 1. The edge strip 8 is advanced and clipped in such manner that it fully covers and extends beyond the forward or leading and the rearward or trailing other small (rounded) sides of the workpiece (compare FIG. 2). Furthermore, the width of the strip 8 is greater than the height or thickness of the plate 1, with excess of the edge strip 8 extending above portion A and below portion B, at the upper side or plane 20 and the lower side or plane 21 of plate 1.

After moving along the edge-gluing device 6, the plate is transported to the shaping device 10. This serves to trim the excess portions A to D of the strip 8, see FIG. 2, such that the strip 8 is fully following or congruently in agreement with the contour or transverse profile of plate 1 at its leading narrow side 2, i.e. is trimmed to be flush with reference to the respective profile of plate 1.

This means that during forward and reverse travel, or cycles, the longitudinal, oval, edge or outline at the leading narrow wide 2 and the upper surface 20, of the lower surface 21, as well as the other narrow sides 3, which are rounded as indicated by reference numerals 4, must be continuously traversed, worked and transported.

The shaping device 10 has a support 11 at which is arranged a pair of universal milling aggregates or units 12, also referred to as universal milling heads. Each unit 12 has a drive motor 13 with a respective drive shaft at which, for the first unit 12, when considered in direction X, the first milling or shaping tool 14 is attached, and at the second unit 12, the second milling or shaping tool 15 is attached. The axes of rotation of both the milling tools 14 and 15 are parallel with respect to the horizontal plane or surface and are transversely perpendicularly disposed with respect to the main axis X when considered in the top plan view of FIG. 1.

The milling units 12 include sensor or control members 16, such that the tools 14 and 15 can be equidistantly and precisely adapted to the moving sides, or respective plane, of the narrow sides 2 of plate 1.

The support 11 is held by guides 17 which are disposed perpendicularly with respect to the horizontal plane of plate 1, and such that the vertical attitude or respective height of the support 11 can be varied. The vertical movement of the support 11 is achieved with the aid of one or several horizontally supported guide members 23 which are also moveable over a predetermined distance in direction X along the bed or base of the machine. For this, the guide members 23 are coupled to a respective drive unit 18.

For effecting the vertical movement, a corresponding drive unit 25 is provided atop the guides 17.

Figure 5:
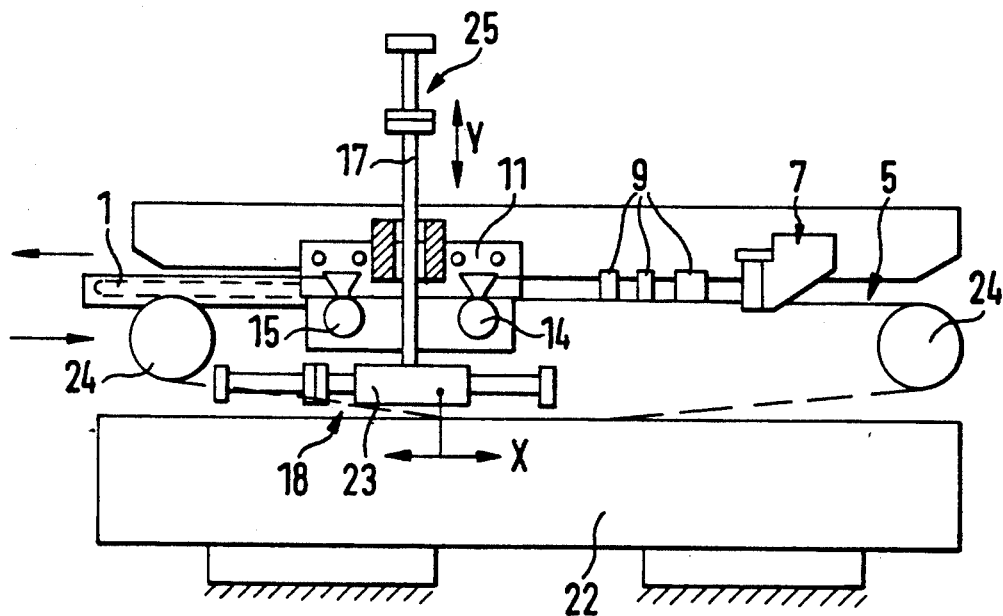
FIG. 5 is a further side elevation of the machine of FIG. 1 during reverse travel or cycle of the workpiece.

The two milling or cutting tools 14 and 15 of the shaping device 10 are positioned to be offset in height; thus, tool 14 is positioned a distance of length a, i.e. with an offset, above the tool 15. When considered in the direction of travel X (see FIGS. 4 and 5), the tools 14 and 15 are positioned to extend sequentially or serially one behind the other, and the first tool 14, in FIG. 1, the one on the right-hand side, is that which is effective during the forwarding travel or cycle of a plate 1, see FIG. 4.

Due to its offset in height a, tool 14 removes the upper excess portion A of edge strip 8 only in part, leaving a remainder portion designated A'. This phase of the operation corresponds to premilling or shaping.

The second milling tool 15, when considering in the direction of travel X, on the other hand, is flush or directly brought to or guided at the upper edge of the respective narrow side 2 at the upper side or plane 20 of a plate 1. Thus, the second milling tool 15 carries out precise shaping or milling for fully removing the remainder portion A' of the edge strip 8 at the upper side 20 of a plate 1.

Once a plate 1 has fully traversed its forward cycle or path beneath or through the milling or shaping device 10, the direction of travel of the conveying device 5 is reversed and the plate 1 is returned to its starting position along axis X. During the course of this motion, the portion C of the edge strip 8 is removed, milled or machined away, at the lower or bottom side or surface 21 of the respective plate 1.

For this, the support 11, and with it the tools 14 and 15, is lowered to such an extent that analogously with respect to the working of the edge strip 8 at the upper side 20, now the tools 14 and 15 are moved in reference to or along the lower side or face 21 of the plate 1. This is indicated in detail in FIGS. 5 and 6. The tools 14 and 15 now have reversed roles or operating modes. Thus, during the reverse motion or cycle of the plate 1, the lower, second, tool 15 which is operative initially, carries out premilling or shaping, and the now subsequently operative tool 14 carries out precise machining or cutting and is moved with reference to the bottom plane 21 of the respective narrow side 2, accordingly, to remove portions C and C' in corresponding manner as described with reference to the upper plane or surface 20.

Removal of the excess or projecting-overhanging edge strip 8 at the upper side or surface 20, on the one hand, of the workpiece 1, requires that during the forward cycle or movement of the workpiece 1 an adjustment of the support 11 is carried out, in order that the two milling tools 14 and 15 are lowered in reference to their respective effective cutting diameters of shaping-cutting, in addition to the offset dimension a.

The profiling or contouring of the rounded edges or sides 4 of the workpiece 1 is more problematic, since now the vertical movement or motion of the support 11 in direction Y (referred to as the Y-direction hereinafter), is to be supplanted with a relative motion or movement between the workpiece 1 and the support 11 and its cutting tools 14 and 15 in direction X.

For this, the feed or delivery motion or movement of the support 11 in direction Y, as a function of the movement of the workpiece 1 by the conveying device 5 in X-direction, can be controlled and is attended to, so that with the respectively operatingly engaging cutting tool 14 and 15 a corresponding rounded edge or curvature can be traversed.

In case of complex edge configuration or rounding, for example with alternatingly arranged concave configured and convex configured arcs of curvature, adjoining at times in various combinations, the relative movement or motion between the workpiece 1 and the cutting tools 14 and 15 may not be sufficient, due alone to the conveying velocity of the conveying device 5 for optional cutting conditions of the cutting tools 14 and 15, which means that the support 11 is particularly moved in such a way in the X-direction, with two options being available:

For one, the workpiece 1 can be stopped on entrance to and or exit from the operating reach of the shaping or profiling device 10, such that by way of movement of the support 11 in the X-direction and in the Y-direction, the profiling or edge shaping or rounding can be attained.

Also, to reduce or lower the operating time, on tracing or moving along the rounded corners, the support 11 can be moved synchronously along with the workpiece 1 for a distance of travel in the direction X, whereby, in spite of the advancing motion of the workpiece 1 when considered in the forward direction of travel of X, the relative movement between the support 11 and the workpiece 1 can be the same as if the workpiece 1 were stationary.

Figure 6:
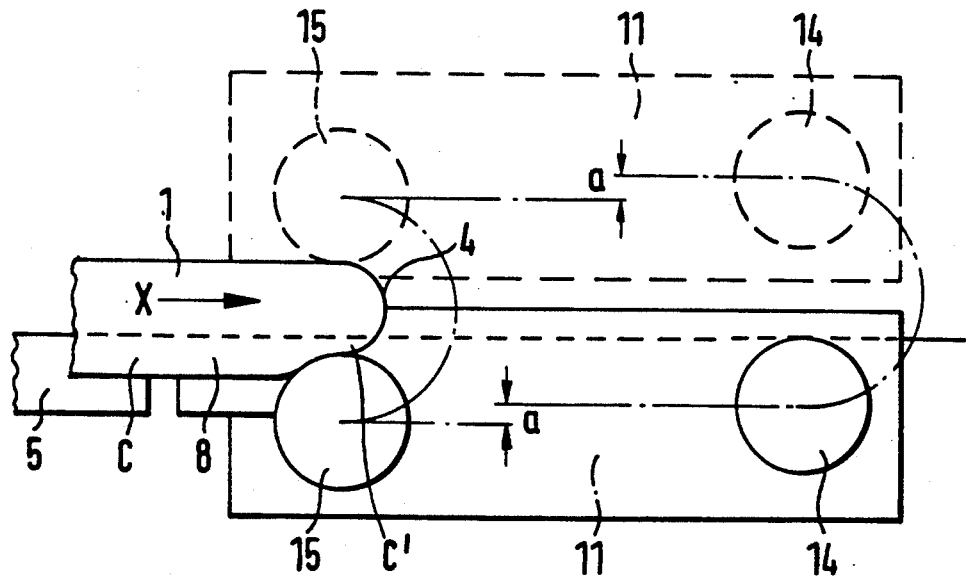
FIG. 6 is a schematic representation, drawn to a larger scale, of the milling tools of the workpiece, and of a section of the conveying device at the commencement of the reverse cycle of the workpiece.

It is important that in the relational attitude between the workpiece 1 and the support 11 the milling tools 14 and 15 traverse through the equidistant of curvature which is required in order to carry out the rounding of the workpiece 1, as is indicated in FIG. 6.

The resultant path velocity of the cutting tools 14 and 15 at the prevailing cutting requirements in each point of a respective path can be optimally achieved, whereby particularly a reduction of the cutting feed rate at the rounded portion is to be present or prevailing.

The application of an edge strip 8 and removal of excess portions at the other narrow or small side 2 or the workpiece 1 is done in a corresponding manner.

It is apparent that the invention achieves the stated object and other objects as well.

What is claimed as new and desired to be protected by Letters Patent is set forth in the following claims:

1. A machine for applying and contour milling or cutting of edge strips or laminates at the narrow sides of plate-shaped workpieces, in a continuously travelling manner, with a conveying device on which the plates are transversely arranged such that the respective leading narrow side is arranged perpendicularly with respect to a longitudinal or main axis of travel, and the respective plate overhangingly extends from the conveying device for access, as well as being secured by clamps, the apparatus also including an edge-gluing device and a shaping-milling device both of which, with respect to the longitudinal axis, are sequentially arranged laterally at the conveying device, and with the apparatus further including at least one milling or cutting tool unit, which extends with its axis of rotation transversely with respect to the main axis, as well as parallel, with respect to the plane of the workpiece and means to feed said unit for operatively contacting and contouringly engaging the upper side of the workpiece, the machine having means providing that at the conclusion of travel of the workpiece at the shaping-milling device, the milling unit is lowered, the direction of travel of the conveying device is reversed and during the return thereof, the milling unit engagingly moves along the lower side of the workpiece.

2. A machine for applying and contouring edge strips at a plate-shaped workpiece having narrow sides, comprising:
- a conveying device, adapted to carry out a forward cycle and a return cycle for passing a respective work-piece to a respective edge-gluing device during the forward cycle, and for moving a respective workpiece in a forward cycle to a respective milling-shaping unit, to remove excess of edge strip from the workpiece, on which the workpiece is transversely arranged such that at least the respective leading narrow side is arranged perpendicularly with respect to a longitudinal main axis of travel, the respective plate overhangingly extends from the conveying device for access:
- an edge-gluing device for applying a respective edge strip to a narrow side of respective workpiece;
- means for supplying a sufficient quantity of edge strip to a workpiece disposed on said conveying device; and
- a shaping-milling device, said shaping-milling device including at least one rotary milling unit extending with its axis of rotation transversely with respect to the main axis of travel and parallel with respect to the plane of a workpiece, and means to feed said device for operatively contacting and contouring upper and lower sides and the corresponding edges of a workpiece.

3. The machine according to claim 2, wherein said edge-gluing device and said shaping-milling device are sequentially and laterally arranged with respect to the longitudinal axis X at said conveying device.

4. The machine according to claim 2 wherein said conveying device includes clamp means for securing a workpiece at said conveying device.

5. The machine according to claim 2, wherein said shaping-milling device is a universal-head milling aggregate, which achieves preprofiling and precise profiling of leading and trailing sides and edges, with reference to the main direction of travel, and at the upper and lower planes of a workpiece.

6. The machine according to claim 5, wherein said shaping-milling device is a universal-head milling unit.

7. The machine according to claim 2, wherein said shaping-milling device is a milling aggregate, which achieves for preprofiling and precise profiling of leading and trailing edges, with reference to the main direction or travel, at the upper and lower edges of a workpiece, by way of copying milling of respective sections of the workpiece, such as edge rounding.

8. The machine according to claim 2, wherein said at least one rotary milling unit includes a rotary drive, and further comprising:
- a support for said shaping-milling device, said support being at least movable perpendicularly with respect to the horizontal plane of a workpiece.

9. The machine according to claim 8, wherein a plate has second narrow and rounded sides and wherein during travel in conformity with said second rounded narrow sides, which when viewed in the main direction of travel are leading or following, the feed rate of the workpiece by said conveying device and the advancement of said at least one milling unit are superposed by means of said support.

10. The machine according to claim 8, wherein said support of said shaping-milling device, when considered in the main direction of travel, can be moved along a limited distance of length in forward and reverse direction.

11. The machine according to claim 9, wherein during shaping of said second narrow sides which, when considered in the direction of main direction of travel, are leading, said support is moved along with the workpiece in the main direction of travel.

12. The machine according to claim 9, wherein during shaping of said narrow sides which, when considered in the direction of main direction of travel are leading, the feed rate of the conveying device is less than that which is used during traversal of straight paths.

13. The machine according to claim 9, wherein during shaping of said second narrow sides, which when considered in the direction of main direction of travel are arranged forwardly and rearwardly, the conveying device, when the workpiece is making contact at, or leaving, the shaping-milling device, is stopped and the rounding is attained through movement of said support carrying said at least one milling unit.

14. The machine according to claim 9, wherein at said support of said shaping-milling device two cutting tools are arranged, which are arranged serially when considered in the main direction of travel, and of which the first, on advancement of a workpiece operatively contacts with its leading side at the shaping-milling device, for preliminary cutting or shaping, is arranged by an offset distance from the plane of the workpiece, whereby on advancement of the workpiece, the second milling tool contactingly traces the upper side of the workpiece, and on reversal of the direction of travel for the workpiece, at which the second milling tool for preliminary shaping is contactingly approached, both milling tools are lowered additionally by the distance equivalent to the height of the offset distance, and the first milling tool operatively contacts and traces the lower side of the workpiece.

15. In a machine for applying and contour-milling plate-shaped workpieces having a first pair of narrow sides and a second pair of narrow sides, in a continuously travelling manner in a single-station mode, said machine including:
- a conveying device on which the workpiece is transversely arranged such that at least the respective leading narrow side is arranged perpendicularly with respect to a longitudinal main axis of travel, and the respective plate overhangingly extends from the conveying device for access;
- an edge-gluing device for applying a respective edge strip to a narrow side of a workpiece;
- means for supplying a sufficient quantity of edge strip to a workpiece disposed on said conveying device; and
- a shaping-milling device with at least one milling unit, which extends with its axis of rotation transversely with respect to the main axis of travel, as well as parallel with respect to the plane of the workpiece and which is at least capable of operatively contacting and engaging the upper side of the workpiece, the improvement comprising:
- means for positioning, at a single workstation, a workpiece at said conveying device;
- means for moving the workpiece with said conveying device, for securing a predetermined length of edge strip at a respective narrow side, to said edge-gluing device;

means for moving the workpiece with said conveying device with reference to said shaping-milling device for profiling the workpiece at the respective narrow side with said at least one milling unit in a forward cycle by operatively engagingly moving the upper side of the workpiece in reference to said at least one milling unit; and means for moving the workpiece with said conveying device with reference to said milling device for profiling said workpiece at the respective narrow side with said at least one milling unit in a reverse cycle by lowering, at the conclusion of forward travel of said workpiece at said shaping-milling device, the respective milling unit, for operatively engagingly moving the lower side of the workpiece in reference to said at least one milling unit.

* * * * *